March 10, 1936.  R. ELLIS  2,033,192
FREIGHT CONTAINER
Filed March 13, 1935   2 Sheets-Sheet 1
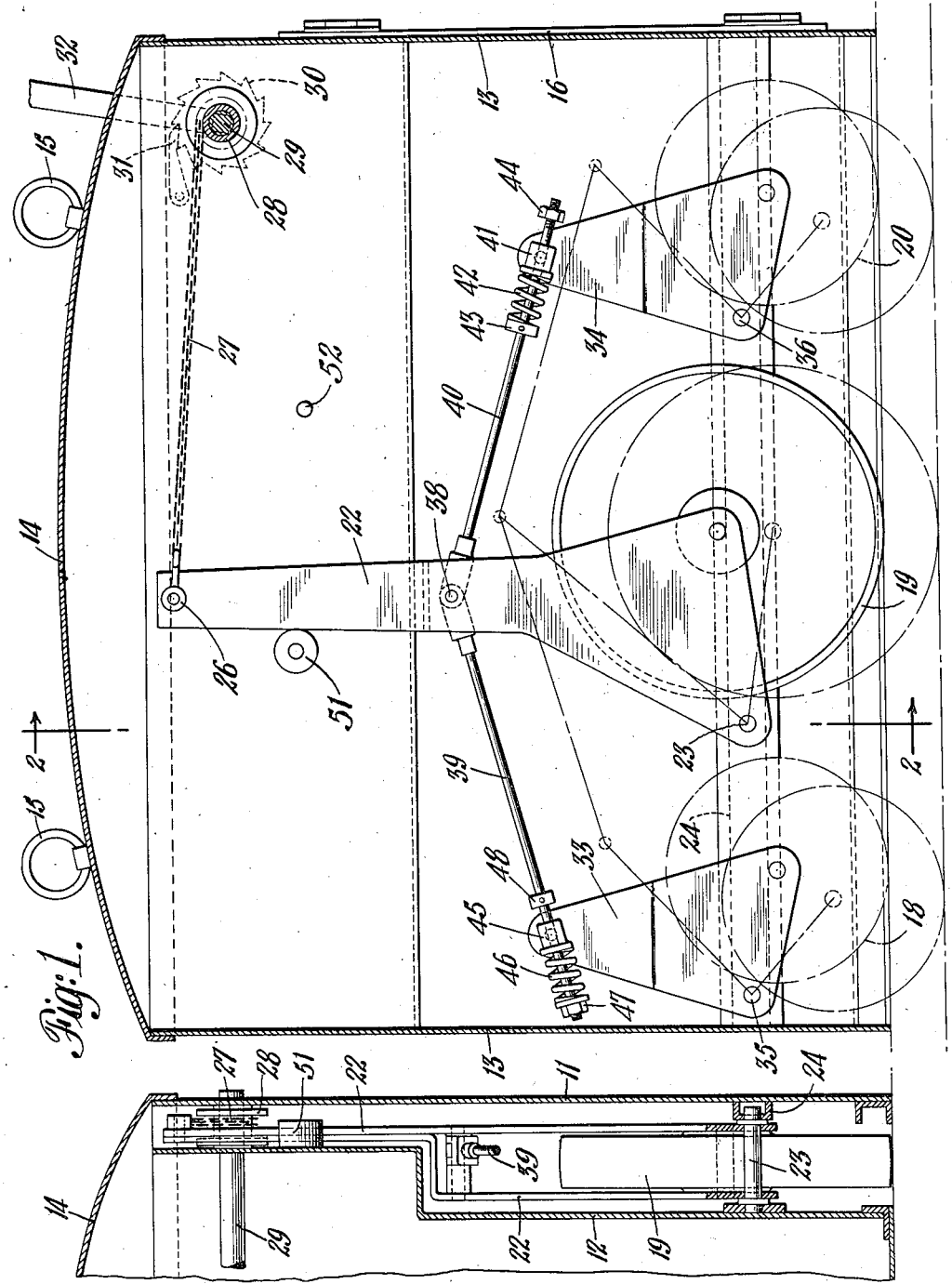
INVENTOR
Ridsdale Ellis March 10, 1936.                R. ELLIS                2,033,192
                          FREIGHT CONTAINER
                       Filed March 13, 1935         2 Sheets-Sheet 2
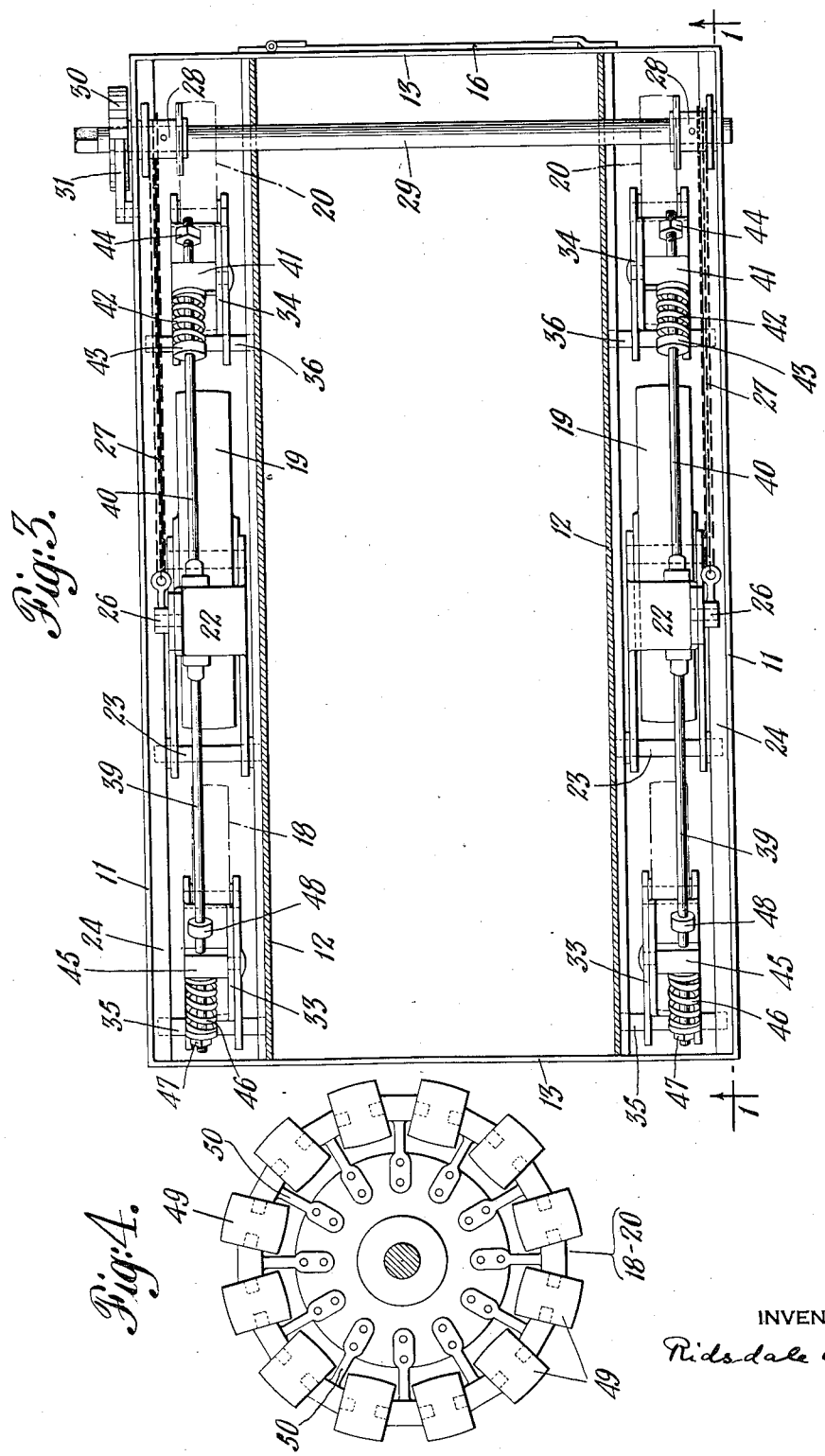
INVENTOR
Ridsdale Ellis Patented Mar. 10, 1936

2,033,192

UNITED STATES PATENT OFFICE 2,033,192

FREIGHT CONTAINER

Ridsdale Ellis, New York, N. Y.

Application March 13, 1935, Serial No. 10,781

3 Claims. (Cl. 280—50)

This invention relates to freight containers provided with wheels so that they can be readily moved when desired.

The principal object of the present invention is to provide a wheeled container which may be moved on its wheels with a minimum of effort and which may be turned readily, preferably in a very small radius.

The ease with which a wheeled object can be moved over a fairly soft or uneven surface is largely a question of wheel diameter, the larger the diameter, the easier it is to move the object. Freight containers, however, must be compact and have a high ratio of goods receiving space with respect to the space occupied by the container as a whole.

For the above reason it is desirable to arrange the wheels at the sides of the container instead of underneath it. For operating along a straight path two or more pairs of large diameter wheels may be arranged at the sides of the container without much more loss of space than the width of the wheel tires or treads. Difficulty arises, however, when it is desired to make the container so that it can move along a curved path. Unless one or more pairs of wheels are skidded sideways over the surface on which they rest, all but one pair of wheels have to swing or castor. With the wheels at the sides of the container there is little room for lateral swinging of the wheels.

According to the present invention this difficulty is overcome by using non-swinging castoring wheels. The tread of these wheels is formed of a series of barrel-shaped rollers each rotating about an axis lying in the plane or rotation of the wheel as a whole. Such wheels are hereinafter termed castoring-rim wheels. A wheel of this construction may have an overall diameter of 2 feet and have its rim formed of 12 or more rollers each of a maximum diameter of less than ¼ of the diameter of the wheels as a whole, say 4 inches. When a container equipped with these wheels is moving in a straight path these wheels have the advantage of ordinary 2-foot wheels, so far as ability to ride over obstructions is concerned. On the other hand when the container is turned they have all of the characteristics of castor wheels with the added advantage that they do not require any space within which to move or swing laterally.

Where the containers have to be moved over soft surfaces, like pine platforms, it is desirable to provide ample wheel-bearing surface. Wheel-bearing surface varies directly with the diameter of the wheel and the width of the tread in contact with the ground. Castoring wheels of necessity cannot have a wide flat tread. According to the present invention this difficulty is overcome by the use of a pair of flat-tread wheels more or less centrally arranged to carry the greater part of the weight of the container. These wheels owing to their large bearing surface do not injure wooden platforms and the like. The castoring-rim wheels are arranged so that they carry little of the weight and act more as load-steadying than as load-carrying wheels.

Usually, although not necessarily, the containers are provided with three pairs of wheels, a centrally-arranged flat-tread pair and two pairs of castoring-rim wheels, one pair near each end of the container. Otherwise the flat-tread wheels have to be off-center somewhat.

Where maximum wheel bearing surface is not essential all of the wheels may be of the castoring-rim type, in which case only two pairs of wheels are required.

To ensure that under normal circumstances the castoring-rim wheels carry little more than the unbalanced portion of the load and yet remain in contact with the ground in spite of small inequalities in the surface of the latter, the castoring-rim wheels may, to advantage be spring mounted.

The distribution of weight between the six wheels may be illustrated by a numerical example. Suppose the container loaded weighs 10,000 lbs. and each of the four castoring-rim wheels are normally pressed downwards by their springs with a pressure of 400 lbs., then the central wheels, with a balanced load, carry 8,400 lbs. and each of the castoring-rim wheels carry 400 lbs. If the load is out-of-balance by 400 lbs., then the springs connected to the pair of castoring-rim wheels at that end are compressed until each of such wheels carries a load of 600 lbs. while the springs connected to the other pair of castoring-rim wheels extend so that the latter pair only carry 200 lbs.

One suitable form of construction is shown, by way of example, in the accompanying drawings, in which:

Fig. 1 is a section on the line 1—1 of Fig. 3,

Fig. 2 is a section on the line 2—2 of Fig. 1,

Fig. 3 is a top plan view of the container with the top removed, and

Fig. 4 is a side elevation of one of the castoring-rim wheels.

The container comprises a housing formed of a bottom 10, outer side walls 11, inner side walls 12, ends 13 and top 14. A door 16 enables entrance to be obtained to the housing. Rings 15 are attached to the upper margins of the sides so that, when desired, the container may be lifted by a crane. Three pairs of retractible wheels 18, 19 and 20 are provided. The middle pair 19 are so arranged that the vertical plane through their axes passes through or near the center of gravity of the container. These wheels carry the bulk of the weight of the container and its contents and the wheels 18 and 20 are merely steadying or stabilizing wheels.

Each wheel 19 is mounted between the two horizontal arms of a double bell-crank lever 22 pivotally mounted at 23 on a channel 24 extending along the inner side of the outer side wall of the container. By moving the vertical arm of the bell-crank to the right (Fig. 1) the wheel 19 can be extended below the bottom of the container housing. For this purpose a chain 27 is attached at one end to the top of the vertical arm of the bell-crank and at the other end to a drum 28 on a shaft 29, so that by rotating the shaft by a suitable lever or handle 32 the chain can be wound on the drum and the bell-crank moved into wheel-extended position. A pawl 31 co-operating with a ratchet wheel 30 is provided to prevent reverse rotation of the shaft until it is desired to retract the wheels.

The container-steadying wheels 18 and 20 are likewise mounted between the two horizontal arms of double bell-cranks 33 and 34 pivotally mounted on the channel 24 at 35 and 36. The vertical arms of these bell-cranks are connected to the bell-crank 22 by a pull-bar 39 and a push-bar 40 respectively so that when the vertical arm of the bell-crank 22 is moved to the right the corresponding arms of the other two bell-cranks are also moved in the same direction to extend the wheels 18 and 20. Springs 46 and 42 are interposed between the pull-bar 39 and the push-bar 40 and the respective bell-cranks which they operate.

The pull-bar 39 passes through a block 45 pivotally mounted between the two bell-crank levers 33. A collar 48 limits the distance the pull-bar can slide through the block 45 in one direction and a nut 47 and spring 46 restrain movement in the opposite direction.

Similarly the push-bar 40 passes through a block 41 pivotally mounted between the two bell-crank levers 34. A collar 43 and the spring 42 restrain movement of the push-bar 40 in one direction and a nut 44 limits movement in the other direction.

The function of the springs 46 and 42 is to enable the wheels 18 and 20 to rise and fall within limits with respect to the load-carrying wheels 19. In this way all the wheels of the container normally contact with the ground and at the same time inequalities in the surface over which the container moves will not cause the bulk of the load to be transferred from the wheels 19 to either or both pairs of wheels 18 and 19.

To advantage the pull and push bars and their co-operating parts are arranged so that, when the bottom of all the wheels are in the same plane and such plane is coincident with the bottom of the container or below the latter but parallel to it, the springs 46 and 42 are under compression. The play between the block 45 and collar 48 and also the play between the block 41 and nut 44 permit the wheel 18 to extend as wheel 19 is retracted relatively to the container, and vice versa.

The springs 46 and 42 should be of such length that when wheel 19 is fully extended the coils of either spring will contact with each other before its corresponding wheel 18 or 20 has retracted far enough to permit the adjacent end of the container to drag on the ground. The distance the wheels 18 and 19 can extend or retract is therefore definitely limited.

As the bulk of the load is carried by the wheels 19 they are formed with wide flat treads, as shown in Fig. 2, to give ample bearing surface.

The wheels 18 and 20 have castoring rims as shown in Fig. 4. Each of these wheels comprises 12 barrel-shaped rollers 49 rotatably mounted between a like number of arms 50. If the container is moved along a curved path the rollers in contact with ground have a compound rolling action; as a part of the wheel rim they roll over the ground in the plane of the wheel and at the same time, by turning about their individual axes they roll over the ground in a direction at right angles to the plane of the wheels and produce the desired castoring effect.

By making the vertical arms of the bell-cranks 33 and 34 short and bringing the vertical arms of the bell-crank 22 together above the wheel 19, the upper part of the inner wall 12 of the container may be offset outwardly, as shown in Fig. 2, to give more goods receiving space. The inner wall may be made removable for the purpose of providing access to the wheels and their operating mechanism.

A rubber ring stop 51 is provided to check movement of the lever 22 as soon as the wheel 19 has been fully retracted. A stop 52 prevents the lever 22 moving too far in the other direction either when the chain 27 is wound up on its drum 28 or when the container is lifted by a crane and the wheels are free to drop down under gravity.

I claim:

1. A freight container comprising, bottom, end and side walls defining a goods receiving space, and three pairs of wheels outside and closely adjacent to said side walls and extending upwardly above the bottom of the container, the middle pair having fixed rims and being arranged so that the vertical plane through their axes is near the center of gravity of the container, the other two pairs having rotatable rims whereby the direction of movement of the container may be changed without either skidding or swinging any of the wheels.

2. A freight container comprising bottom, end and side walls defining a goods receiving space, and wheels outside and closely adjacent to said side walls and extending upwardly above the bottom of the container, said wheels having transversely rotatable rims whereby the direction of movement of the container may be changed without either skidding or swinging any of said wheels.

3. A freight container having three pairs of wheels, the middle pair having fixed rims and being arranged so that the vertical plane through their axes is near the center of gravity of the container, the other two pairs having rotatable rims whereby the direction of movement of the container may be changed without either skidding or swinging any of the wheels and means for maintaining load-distribution between the three pairs of wheels whereby under normal conditions the greater part of the load is carried by said middle pair.

RIDSDALE ELLIS.